United States Patent
Tomita

(10) Patent No.: US 6,335,070 B1
(45) Date of Patent: Jan. 1, 2002

(54) RECORD MEDIUM, RECORD MEDIUM MANUFACTURING APPARATUS AND INFORMATION RECORDING/REPRODUCING APPARATUS

(75) Inventor: Yoshimi Tomita, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/414,604

(22) Filed: Oct. 8, 1999

(30) Foreign Application Priority Data

Oct. 12, 1998 (JP) .............................. 10-289710

(51) Int. Cl.$^7$ ................................. B32B 3/02

(52) U.S. Cl. ................... 428/64.1; 428/64.4; 369/275.4

(58) Field of Search ............................... 428/64.1, 64.2, 428/64.4, 913; 430/270.11, 495.1, 945; 369/275.1, 275.4

(56) References Cited

U.S. PATENT DOCUMENTS

| | | | | |
|---|---|---|---|---|
| 5,870,375 A | * | 2/1999 | Maeda | 369/275.3 |
| 5,909,412 A | * | 6/1999 | Nakayama | 369/30 |
| 5,933,411 A | * | 8/1999 | Inui | 369/275.4 |
| 5,940,364 A | * | 8/1999 | Ogata | 369/275.4 |

* cited by examiner

*Primary Examiner*—Elizabeth Evans
(74) *Attorney, Agent, or Firm*—Young & Thompson

(57) ABSTRACT

A record medium (1) is provided with: a main body; a groove track (1G) formed on the main body, as one track for recording information onto which a light beam for recording and/or reproducing the information is irradiated; and a land track (1L) formed on the main body, which is adjacent to the groove track, as another track for recording the information onto which the light beam for recording and/or reproducing the information is irradiated. A judgment wobble (W), which has a judgment pattern to judge whether the light beam is irradiated onto the groove track or the land track, is formed on only one side wall of the groove track.

10 Claims, 14 Drawing Sheets

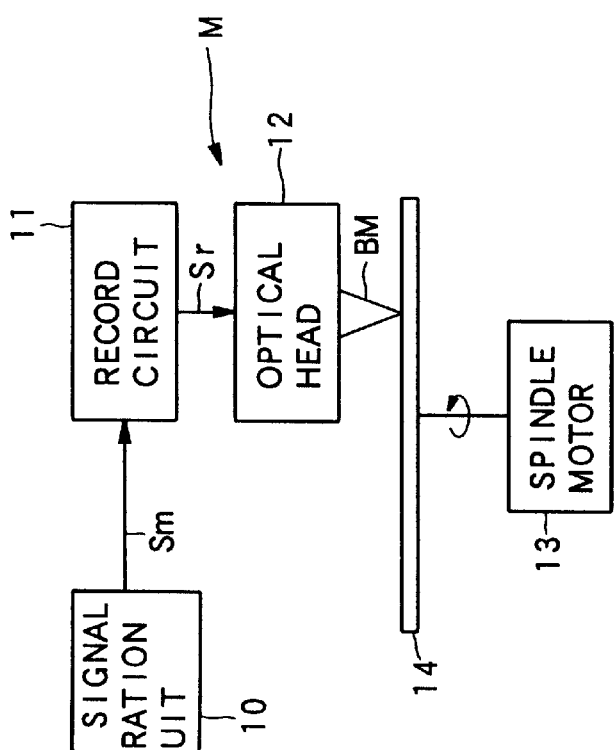
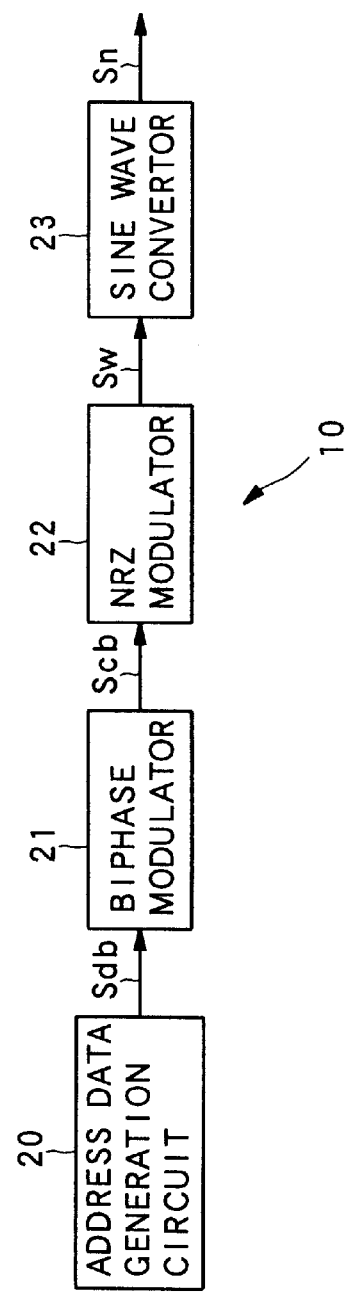
FIG. 4A
FIG. 4B

RECORD MEDIUM, RECORD MEDIUM MANUFACTURING APPARATUS AND INFORMATION RECORDING/REPRODUCING APPARATUS

BACKGROUND OF THE INVENTION

1. Field of the Invention

The present invention relates to a record medium onto and from which record information is optically recorded/reproduced, a record medium manufacturing apparatus for manufacturing the record medium, and an information recording/reproducing apparatus for record/reproducing the record information onto and from the record medium. More particularly, the present invention relates to a record medium on which so-called a groove track and a land track are both formed as the track for recording the record information, a record medium manufacturing apparatus for recording the record medium, and an information recording/reproducing apparatus for record/reproducing the record information onto and from the record medium.

2. Description of the Related Art

In order to improve a record density of an optical disc, research and development with regard to a so-called "land/groove record" are carried out for forming an information mark corresponding to each record information on both of a groove track of the optical disc (i.e., a convex track when observed from a surface of a side, to which a light beam is irradiated, of the optical disc) and a land track (i.e., a concave track when observed from the surface of the side, to which the light beam is irradiated, of the optical disc) formed adjacent to the groove track, and then recording the record information onto both of the groove track and the land track.

Here, as an optical disc employing the land/groove record, there is a so-called DVD-RAM (DVD-Random Access Memory) standardized in recent years. As a method of judging whether the light beam is being irradiated onto the groove track or the land track when the record information is recorded and reproduced onto and from this DVD-RAM, there is a first method of detecting a pre-pit (which is formed so as to be deviated toward an outside or an inside in a radius direction from a central line in the groove track or the land track) formed within a CAPA (Complimentary Allocated Pit Address) area formed on the information record surface of the DVD-RAM, and thereby judging whether the light beam is being irradiated onto the groove track or the land track.

In addition, the above-mentioned standard of DVD-RAM is described in detail in, for example, NIKKEI Electronics, Oct. 10, 1997 (No. 700), pages 307–319, and NIKKEI Electronics, Oct. 20, 1997 (No. 701), pages 167–186.

Moreover, the reason why it is judged whether the light beam is irradiated onto the groove track or the land track when the record information is recorded and reproduced onto and from the DVD-RAM is that, since a polarity of a so-called tracking error signal is inverted depending on whether the light beam is irradiated onto the groove track or the land track, a tracking servo control can not be accurately carried out unless it is judged. The reason why this inverting phenomenon is induced is as follows. That is, if the light beam is irradiated onto the groove track, the light beam is irradiated to the convex portion to thereby decrease a light quantity of a reflection light thereof. Thus, when the light beam is accurately irradiated onto the groove track, the light quantity of the reflection light thereof is smaller than that of the case when the tracking is deviated. On the contrary, if the light beam is irradiated onto the land track, the light beam is irradiated onto the concave portion having a mirror surface to thereby increase a light quantity of a reflection light thereof. Thus, when the light beam is accurately irradiated onto the land track, the light quantity of the reflection light thereof is larger than that of the case when the tracking is deviated.

On the other hand, there is a second method of judging, whether the light beam is irradiated onto the groove track or the land track, by using a difference between quantities of reflection lights of the light beams resulting from a difference between widths of a groove track and a land track, for example, as disclosed in Japanese Laid Open Patent Application (JP-A-Heisei 9-120584).

However, according to the first method, by the existence of the CAPA area, the groove track or the land track does not exist in that portion. This results in a problem that this record format is not suitable for an operation of recording/reproducing the record information, in which a continuity is important, such as video information and audio information.

Moreover, in case of the record format of the DVD-RAM in which the groove track or the land track is intermittent, there is such a problem that the record information recorded on the DVD-RAM cannot be reproduced by using a reproducing apparatus for reproducing, for example, DVD-ROM (DVD-Read Only Memory) in which the groove track or the land track is formed without the intermittence (recently, this kind of reproducing apparatus begins to be commercially sold)

On the other hand, the second method has a problem that, when the groove track and the land track are formed at the same width, it is impossible to discriminate between the types of the tracks to which the light beam is irradiated.

SUMMARY OF THE INVENTION

The present invention is proposed in view of the above mentioned problems. It is therefore an object of the present invention to provide a record medium, on which record information is recorded on both of a groove track and a land track which allows to record and/or reproduce the record information while maintaining a continuity of the record information and with accurately judging the types of the tracks onto which a light beam is irradiated, a record medium manufacturing apparatus for manufacturing the record information, and an information recording/reproducing apparatus for record/reproducing the record information onto and from the record medium.

The above object of the present invention can be achieved by a record medium such as an optical disc etc., provided with: a main body; a groove track formed on the main body, as one track for recording information onto which a light beam for recording and/or reproducing the information is irradiated; and a land track formed on the main body, which is adjacent to the groove track, as another track for recording the information onto which the light beam for recording and/or reproducing the information is irradiated, wherein a judgment wobble, which has a judgment pattern to judge whether the light beam is irradiated onto the groove track or the land track, is formed on only one side wall of the groove track.

According to the record medium of the present invention, since the judgment wobble is formed on only one side wall of the groove track, a wave form of a light detection signal detected at the judgment wobble when the light beam is irradiated onto the groove track is different from that when the light beam is irradiated onto the land track. Accordingly, when recording/reproducing the information, it is possible to precisely judge whether the light beam is moving on the groove track or the land track. Consequently, it is possible to record/reproduce the information while accurately controlling the irradiation condition of the light beam.

Further, since the judgment wobble is formed such that the groove track or the land track is not intermittent by the existence of the judgment wobble, it is possible to record/reproduce the information continuously, which is very preferable when recording/reproducing video information, audio information and the like for which the continuity of the information is important.

In one aspect of the record medium of the present invention, a wobble having another pattern different from the judgment pattern is formed in an area of the only one side wall other than an area where the judgment wobble is formed.

According to this aspect, the periodic signal used to move the record medium for example, can be recorded as the wobble on the only one side wall of the groove track which wobbles at a period or cycle corresponding to the periodic signal, without reducing the record capacity of the groove track or the land track.

In this aspect, the another pattern may correspond to address information indicative of a record position on the record medium.

By constructing in this manner, the address information can be recorded and the judgment wobble can be formed without reducing the record capacity of the groove track or the land track.

In another aspect of the record medium of the present invention, the main body is shaped in a disc, and the groove track and the land track are formed such that the information is recorded and/or reproduced while the light beam is relatively moving on the groove track and the land track alternately for each rotation of the record medium.

According to this aspect, it is possible to continuously record/reproduce the information at a high density.

In this aspect, the judgment wobble may be formed adjacent to a boundary between the land track and the groove track in a circumference direction of the record medium.

By constructing in this manner, it is possible to judge whether the light beam is irradiated onto the groove track or the land track immediately after the groove track and the land track are exchanged.

In another aspect of the record medium of the present invention, no wobble is formed in an area of the only one side wall other than an area where the judgment wobble is formed.

According to this aspect, the judgment wobble can have any judgment pattern as long as it can be recognized as the judgment pattern. Thus, it is possible to simplify the judgment pattern, so that the formation of the judgment wobble can be also rather easy in the manufacturing process.

The above object of the present invention can be also achieved by a record medium manufacturing apparatus for manufacturing the above described record medium of the present invention. The record medium manufacturing apparatus is provided with: a track forming device such as an optical head etc., for forming the groove track and the land track on the main body; a generation device such as a mark signal generation circuit etc., for generating a wobbling signal corresponding to the judgment pattern; and a wobble forming device such as an optical head etc., for forming the judgment wobble on the only one side wall, on the basis of the wobble signal generated by the generation device.

According to the record medium manufacturing apparatus of the present invention, since the judgment wobble is formed on only one side wall of the groove track, a wave form of a light detection signal detected at the judgment wobble when the light beam is irradiated onto the groove track is different from that when the light beam is irradiated onto the land track. Accordingly, when recording/reproducing the information, it is possible to precisely judge whether the light beam is moving on the groove track or the land track. Consequently, it is possible to record/reproduce the information while accurately controlling the irradiation condition of the light beam.

Further, since the judgment wobble is formed such that the groove track or the land track is not intermittent by the existence of the judgment wobble, it is possible to record/reproduce the information continuously.

In one aspect of the record medium manufacturing apparatus of the present invention, the main body is shaped in a disc, and the track forming device forms the groove track and the land track such that the information is recorded and/or reproduced while the light beam is relatively moving on the groove track and the land track alternately for each rotation of the record medium.

According to this aspect, it is possible to continuously record/reproduce the information at a high density.

The above object of the present invention can be achieved by an information recording/reproducing apparatus for recording/reproducing information with respect to the above described record medium of the present invention. The information recording/reproducing apparatus is provided with: a detection device such as an optical pickup etc., for detecting the judgment wobble; a judgment device such as an LG (Land/Groove) judgment section etc., for judging whether the light beam is moving on the groove track or the land track on the basis of the judgment wobble detected by the detection device; and a recording/reproducing device such as an optical pickup etc., for recording/reproducing the information with respect to the groove track and the land track, on the basis of a judgment result of the judgement device.

According to the information recording/reproducing apparatus, since the information is recorded and/or reproduced while judging whether the track onto which the light beam is irradiated is the groove track or the land track, it is possible to record and/or reproduce the information precisely and certainly.

In one aspect of the information recording/reproducing apparatus of the present invention, the main body is shaped in a disc, and the apparatus further comprises: a tracking servo device such as an optical pickup etc., for servo-controlling an irradiated position of the light beam on the record medium in a radial direction of the record medium; and a tracking control device such as a tracking controller etc., for controlling the tracking servo device on the basis of the judgment result.

According to this aspect, since the tracking servo is performed while judging whether the track onto which the light beam is irradiated is the groove track or the land track, it is possible to record and/or reproduce the information precisely while precisely controlling the irradiated position of the light beam in the radial direction of the record medium.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 4A is a block diagram showing a whole configuration of an optical disc manufacturing apparatus in the first embodiment;

FIG. 4B is a block diagram showing a detailed configuration of a mark signal generation circuit in the optical disc manufacturing apparatus of FIG. 4A;

DETAILED DESCRIPTION OF THE PREFERRED EMBODIMENTS

Preferred embodiments of the present invention will be explained below with reference to the drawings. In the following embodiments, the present invention is applied to: an optical disc for recording which has a groove track and a land track adjacent to each other and in which, while both of the groove track and the land track are exchanged for each rotation (cycle) of the optical disc, a light beam is irradiated onto them, and record information is recorded thereon; an apparatus for manufacturing the optical disc; an information recording apparatus for recording the record information onto the optical disc; and an information reproducing apparatus for reproducing the record information already recorded on the optical disc from the optical disc.

(I) First Embodiment

At first, a first embodiment according to the present invention will be described with reference to FIGS. 1 to 10.

(A) First Embodiment of Optical Disc

At first, an embodiment of an optical disc as one example of a record medium according to the first embodiment is described with reference to FIGS. 1 to 3.

Figure 1:
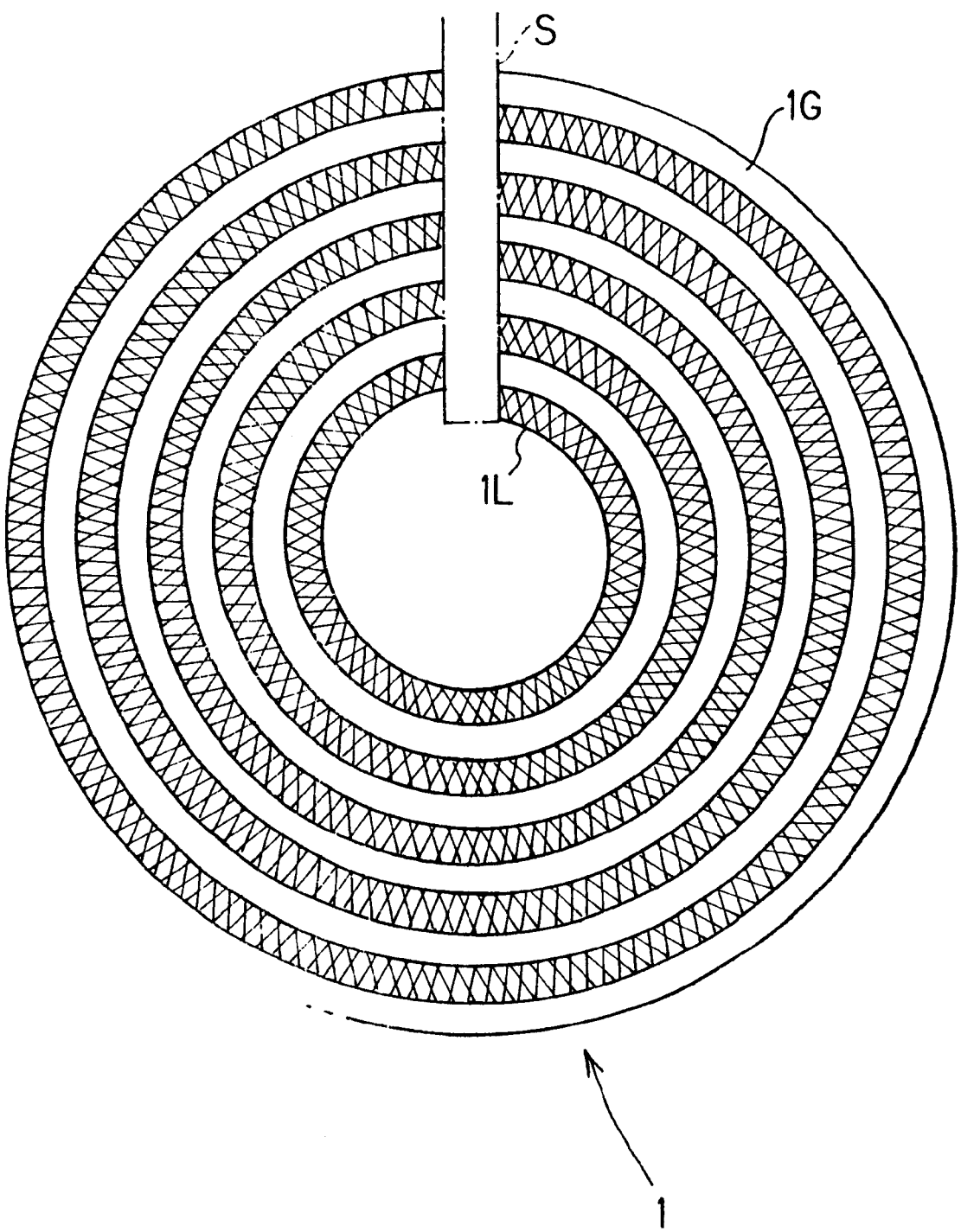
FIG. 1 is a plan view showing a record format of an optical disc.
Figure 2A:
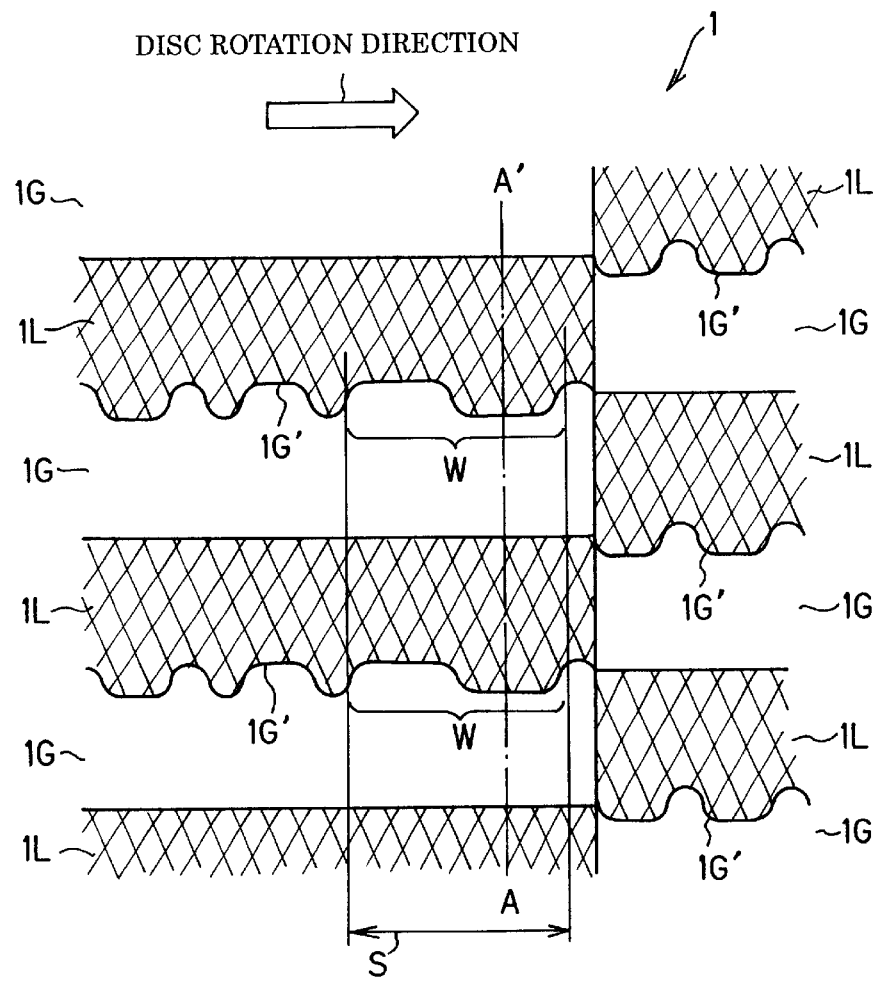
FIG. 2A is an enlarged plan view in the vicinity of a judgment area according to a first embodiment.
Figure 2B:
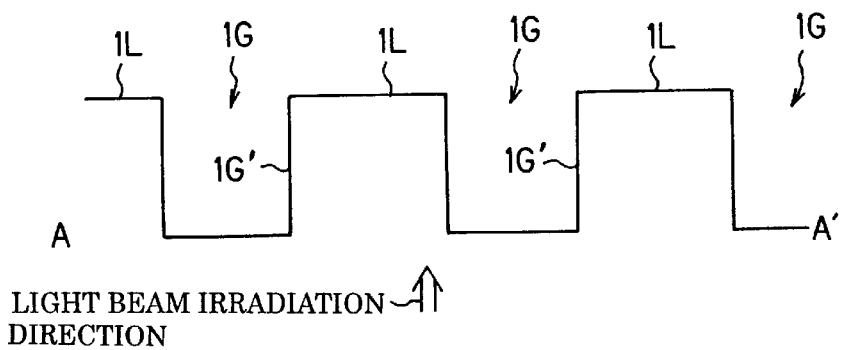
FIG. 2B is a A–A' sectional view of FIG. 2A.

FIG. 1 is a plan view showing a record format of the optical disc according to the first embodiment. FIGS. 2A and 2B are enlarged views in the vicinity of a judgment area according to the first embodiment, and FIG. 3 is a perspective view of FIGS. 2A and 2B.

As shown in FIG. 1, an optical disc 1 of the embodiment uses a so-called land/groove (L/G) recording method in which digital information is recorded on both of groove tracks 1G and land tracks 1L that are formed in advance. In addition, in FIG. 1, the land tracks 1L are shown with hatching, and the groove tracks 1G are shown in white.

In the optical disc 1, each land track 1L and each groove track 1G are linked to each other for each rotation of the disc by a judgment area S shown in FIG. 1 as a boundary. One spiral track is formed on the entire optical disc 1 by combining a series of the land tracks 1L and the groove tracks 1G. Such a type of track is typically referred to as a single spiral-land/groove (SS-LG). The SS-LG recording method is detailed in, for example, "Access Method of Single Spiral-Land/Groove Record", by Nakano et al., published in TECHNICAL REPORT OF IEICE, MR95-88, CPM95-126 (1996-02) from Electronic Information Communication Association.

Next, the detailed structure of the judgment area S according to this embodiment will be described below with reference to FIGS. 2A, 2B and 3. In addition, FIG. 2A is an enlarged view showing an area on the optical disc 1 including the judgment area S, and FIG. 2B is a A–A' sectional view of FIG. 2A.

Figure 3:
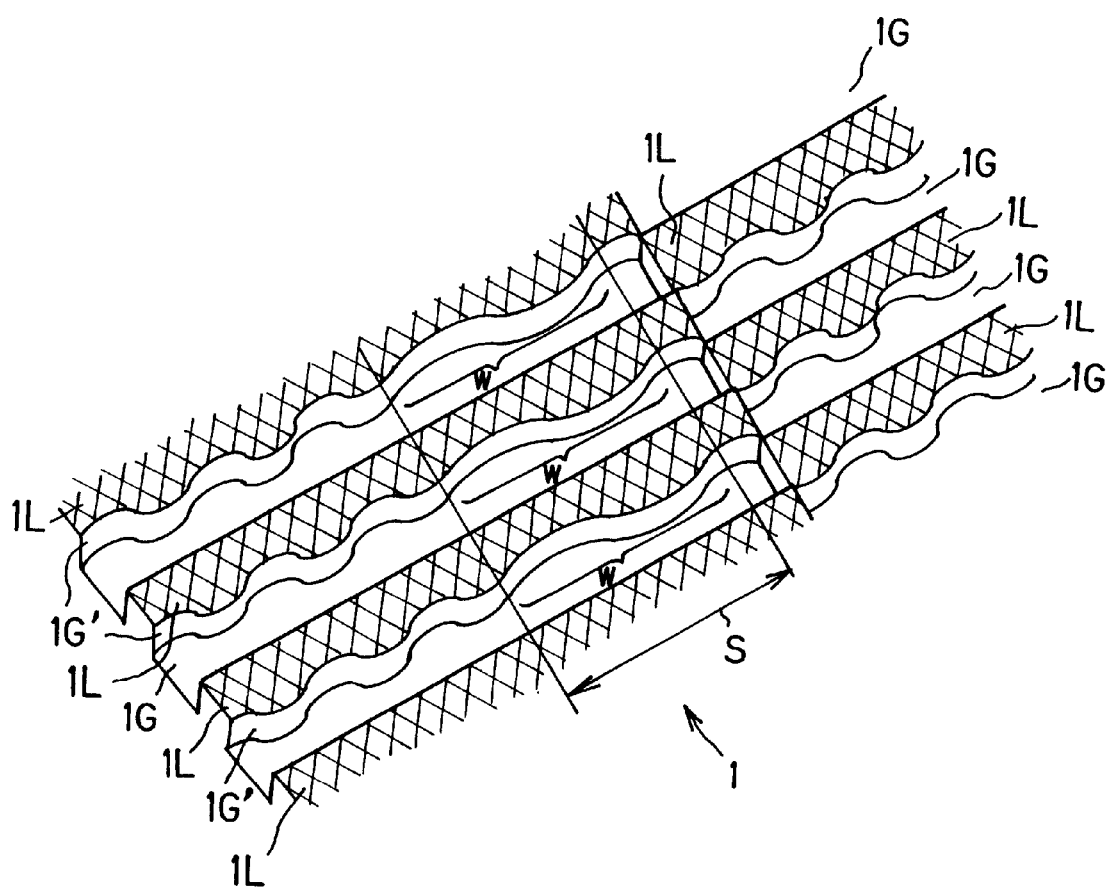
FIG. 3 is a perspective view of a portion shown in FIGS. 2A and 2B.

As shown in FIG. 2A and FIG. 3, in the optical disc 1 of the embodiment, a wobble (i.e., a swell in a form of wave) is formed on only one side wall 1G' among two side walls of each of the groove tracks 1G (in other words, the one side wall 1G' is also a side wall of each of the land tracks 1L) over all the groove tracks 1G, which are formed by concaving and convexing an information record surface of the optical disc 1 as shown in FIG. 2B. Address information indicative of a record position on the optical disc 1 is recorded by the wobble. Here, this address information is referred to when the record information is recorded onto the groove tracks 1G and the land tracks 1L on the optical disc 1 and when the record information is read out from the respective tracks.

That is, when the record information is to be recorded on the optical disc 1, the wobble is firstly detected to thereby obtain the address information. Then, the record information is recorded at a record position to be recorded, which is instructed by corresponding address information based on the obtained address information.

At this time, the address information is obtained by a so-called push-pull method, in such a way that a detector, which is divided into two partial detectors by a division line parallel to a circumference direction of the optical disc 1, is used to receive a reflection light of a light beam (i.e., a light beam for recording the record information whose light intensity is modulated by the record information) from the groove track 1G, as described later.

Here, in the optical disc 1 of the embodiment, the wobble of the groove track 1G within the judgment area S (hereafter, the wobble within the judgment area S is referred to as a "wobble W") has a pattern, which is never used when the address information is recorded (hereafter, this pattern is referred to as a "judgment pattern").

As this judgment pattern, for example, if the address information is recorded as a wobble by a later-described bi-phase modulation, "111000" is used which is a pattern that is never appeared in the address information after the bi-phase modulation. Incidentally, FIGS. 2A and 3 schematically show a case that the wobble W is formed by using this judgment pattern of "111000".

As shown in FIG. 2A, it is desirable that the judgment area S is formed at a position on the optical disc 1 immediately after the track to which the light beam is irradiated is exchanged from the groove track 1G to the land track 1L (in other words, immediately after the track is exchanged from the land track 1L to the groove track 1G).

Moreover, it is designed that the judgment patterns in all the wobbles W within the judgment area S are identical to each other, as shown in FIGS. 2A and 3.

The judgment area S having the above-mentioned configuration is formed in the area to which the light beam immediately after the exchanging of the type of the track is irradiated. Thus, when the wobble W is detected at a time of recording the record information or at a time of reproducing the already-recorded record information, a phase of a later-described push-pull signal Spp as the detected result of the wobble W in a case when the light beam reaches the judgment area S during moving on the land track 1L is opposite to that in a case when the light beam reaches the judgment area S during moving on the groove track 1G. Accordingly, whether the light beam is moving on the groove track 1G or the land track 1L can be detected by detecting a difference between the above-mentioned phases by using a later-described method.

The case in which the information recorded by using the wobble is only the address information is described in the above-mentioned configuration of the optical disc 1. However, other than this case, a periodical signal to control a rotation number of a later-described spindle motor in the information recording apparatus and the information reproducing apparatus may be recorded by using the wobble (namely, a periodical signal to extract a control clock to control the rotation number).

(B) First Embodiment of Optical Disc Manufacturing Apparatus

A first embodiment of an optical disc manufacturing apparatus for forming the wobbles W shown in FIGS. 1 to 3 on the optical disc 1 and then manufacturing the optical disc will be described below with reference to FIGS. 4A to 7C.

In addition, the following optical disc manufacturing apparatus is to manufacture an original disc (which may be also referred to as a stamper disc) in order to mass-produce the optical disc 1 on which the land tracks 1L and the groove tracks 1G having the wobbles shown in FIGS. 1 to 3 are formed, in a replica process.

Figure 5:
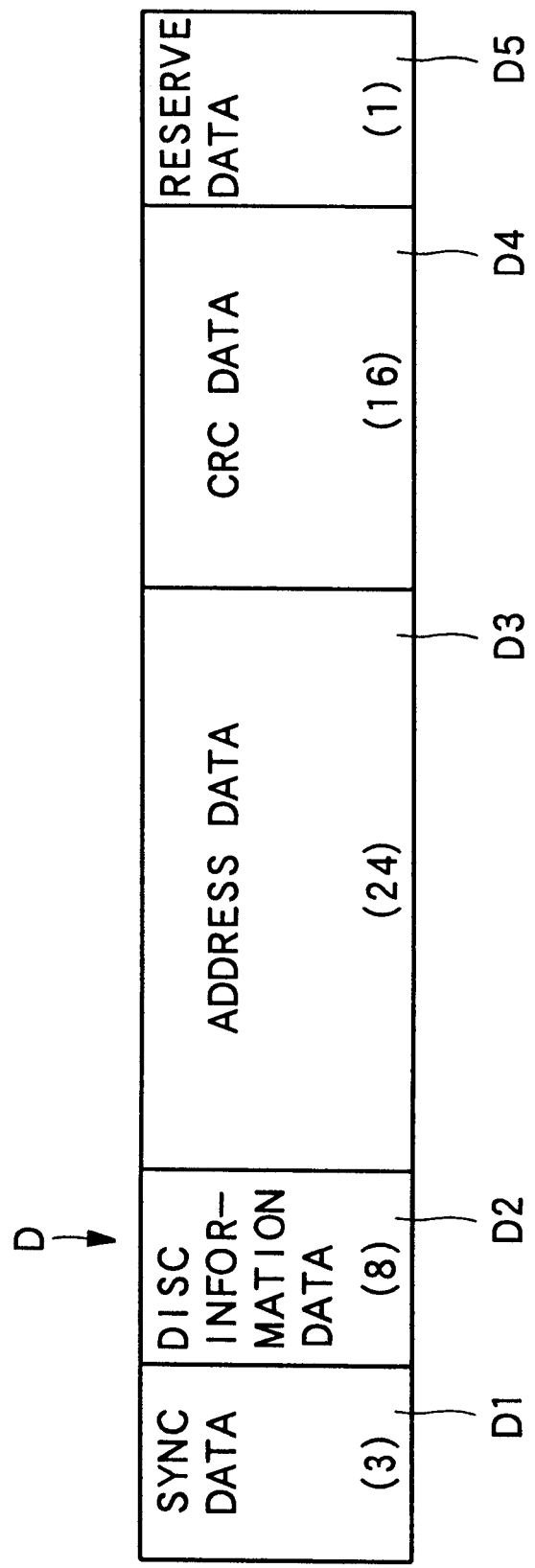
FIG. 5 is a view showing a data structure of data recorded on an original disc.
Figure 6:
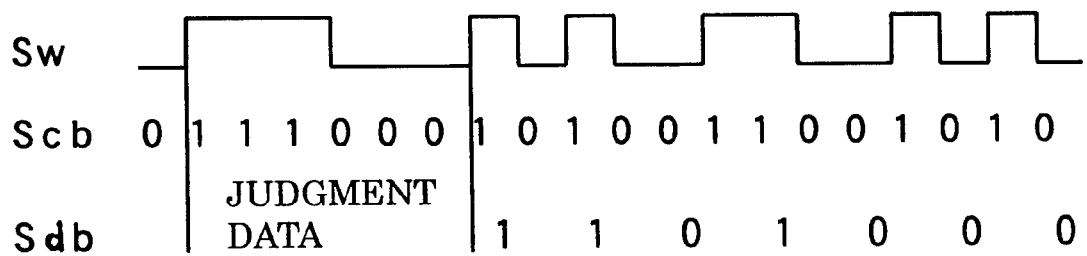
FIG. 6 is a timing chart (I) to describe an operation of manufacturing an optical disc.
Figure 7A:
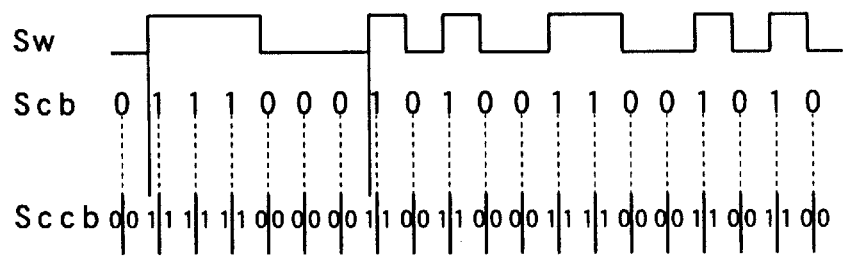
FIG. 7A is a timing chart (II) to describe the operation of manufacturing the optical disc, in which a bi-phase modulation is explained.
Figure 7B:
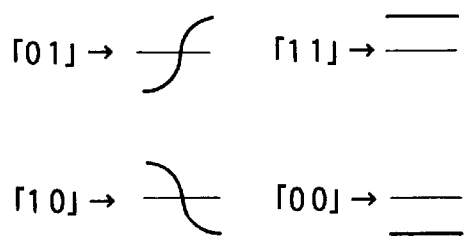
FIG. 7B is a timing chart (I) to describe an operation of a sine wave converter.

FIGS. 4A and 4B are block diagrams showing the optical disc manufacturing apparatus, FIG. 5 is a diagram showing a data structure of address data etc., recorded on the original disc, and FIGS. 6, 7A and 7B are timing charts to describe the operations of manufacturing the optical disc.

As shown in FIG. 4A, an optical disc manufacturing apparatus M of the embodiment is provided with a mark signal generation circuit 10 serving as one example of a generator, a record circuit 11, an optical head 12 serving as one example of a track generator and also as one example of a wobble generator, and a spindle motor 13.

As shown in FIG. 4B, the mark signal generation circuit 10 is provided with an address data generation circuit 20, a bi-phase modulator 21, an NRZ (Non Return to Zero) modulator 22 and a sine wave converter 23.

Next, the whole operation is explained.

The mark signal generation circuit 10 generates a mark signal Sm including the address information to be recorded onto the optical disc 1 by wobbling the one side wall 1G' of the groove track 1G as shown in FIGS. 1 to 3, and then outputs it to the record circuit 11. At this stage of the mark signal Sm, it is generated as an analog signal having a wave form (a wave form of sine wave having no corner) indicative of a form of the wobble corresponding to digital data to be recorded as the address information.

Next, the record circuit 11 amplifies the inputted mark signal Sm and performs a so-called write strategy with respect to the amplified mark signal Sm so as to shape the wobble to be formed on an original disc 14. Then, the record circuit 11 generates a drive signal Sr to drive a laser diode (not shown) contained in the optical head 12, and further outputs it to the optical head 12.

The optical head 12 has the configuration containing the laser diode, an objective lens and the like (which are not shown). The optical head 12 generates a light beam BM to form the groove tracks 1G and the land tracks 1L by driving the laser diode on the basis of the drive signal Sr and irradiates it to a position where each track on the original disc 14, which is rotated at a predetermined rotation number by the spindle motor 13, is to be formed. At this time, the original disc 14 is being rotated and moved in a radial direction of the original disc 14 by the spindle motor 13 and a transferring mechanism (not shown). Accordingly, the groove tracks 1G and the land tracks 1L are formed in the spiral form, as shown in FIG. 1.

The original disc 14 is formed such that resist having photosensitivity to the light beam BM is coated on a substrate in a form of disc. This resist is exposed to the light beam BM, and is changed into the shape corresponding to the land track 1L and the groove track 1G containing the wobble. Accordingly, the original disc 14 as a stamper disc is completed through later processes, such as a baking process and so on.

Next, the detailed operations of the mark signal generation circuit 10 is described below with reference to FIGS. 4B and 5 to 7C.

At first, the address data generation circuit 20 generates an address signal Sdb (refer to a bottom stage of FIG. 6)

including address information to be recorded onto the optical disc 1 by wobbling the side wall 1G' of the groove track 1G.

This address signal Sdb is described in further detail with reference to FIG. 5. The address signal Sdb is constituted by a plurality of wobbling address frames D each including the address information to be recorded. One wobbling address frame D is provided with a total of 51 bits of data comprising: a synchronization data D1 (3 bits) for the sake of synchronization for each wobbling address frame D; a disc information data D2 (8 bits) having information indicative of an information record surface on which the address information corresponding to the wobbling address frame D is recorded, for example, if the optical disc 1 has information record surfaces of a plurality of layers; an address data D3 (24 bits) indicative of the address information to be actually formed as a wobble; an error correction data D4 {which is also referred to as CRC (Cyclic Redundancy Code) data and is an error detection signal except a synchronization signal} D4 (16 bits) used for an error correction at a time of detecting the address information; and a spare data D5 (1 bit), in order starting from the first bit, as shown in FIG. 5.

In addition, the judgment data (refer to the bottom stage of FIG. 6) to form the wobble W within the judgment area S in the address signal Sdb includes the data to form a pattern, which is never included within a channel bit signal Scb after the later-described bi-phase modulation.

Next, when the address signal Sdb constituted by the wobbling address frames D is inputted to the bi-phase modulator 21, the bi-phase modulator 21 performs the bi-phase modulation on the address signal Sdb, and then generates the channel bit signal Scb (refer to a middle stage of FIG. 6).

The bi-phase modulation is a modulation method for modulating a bit indicative of "1" among the respective bits in the address signal Sdb into a channel bit signal Scb (digital data) of "10", and on the other hand, converts a bit indicative of "0" into a channel bit signal Scb of "01". That is, a data of "10" in the address signal Sdb is converted into a channel bit signal Scb of "1001". A data of "01" in the address signal Sdb is converted into a channel bit signal Scb of "0110". A data of "00" in the address signal Sdb is converted into a channel bit signal Scb of "0101". A data of "11" in the address signal Sdb is converted into a channel bit signal Scb of "1010".

Thus, the content of the judgment data in the address signal Sdb is established so as to generate a pattern of "111000" for example, which is never included within the channel bit signal Scb.

Next, the NRZ modulator 22 performs a so-called NZR modulation on the inputted channel bit signal Scb, and then generates a modulation signal Sw (refer to a top stage of FIG. 6), and further outputs it to the sine wave converter 23.

At this time, the modulation signal Sw has a wave form shown at the top stage of FIG. 6 as the wave form corresponding to the address signal Sdb.

Then, the sine wave converter 23 converts the modulation signal Sw having a rectangular wave form shown at the top stage of FIG. 6, into a mark signal Sm that is an analog signal having a wave form indicative of a shape of a wobble corresponding to the digital data to be recorded as the address information as mentioned above.

Here, the conversion operation in the sine wave converter 23 is described in detail with reference to FIGS. 7A to 7C.

The sine wave converter 23, when receiving the modulation signal Sw, firstly performs a double-clock operation on the modulation signal Sw, and then generates a double clock signal Sccb having a data shown at a bottom stage of FIG. 7A.

Next, the sine wave converter 23 divides the double clock signal Sccb for each two bits at a timing corresponding to each bit of the original channel bit signal Scb, as shown at the bottom stage of FIG. 7A.

An analog wave form shown in FIG. 7B is assigned to each divided two bits. That is, if the divided two bits are "01", a component corresponding to a quarter of a sine wave form is assigned which is changed from a negative side to a positive side with a zero level between, as shown in FIG. 7B. If the divided two bits are "11", a wave form of a predetermined constant positive level is assigned, as shown in FIG. 7B. If the divided two bits are "10", a component corresponding to a quarter of a sine wave form is assigned which is changed from a positive side to a negative side with a zero level between, as shown in FIG. 7B. And, if the divided two bits are "00", a wave form of a predetermined constant negative level is assigned, as shown in FIG. 7B.

Figure 7C:
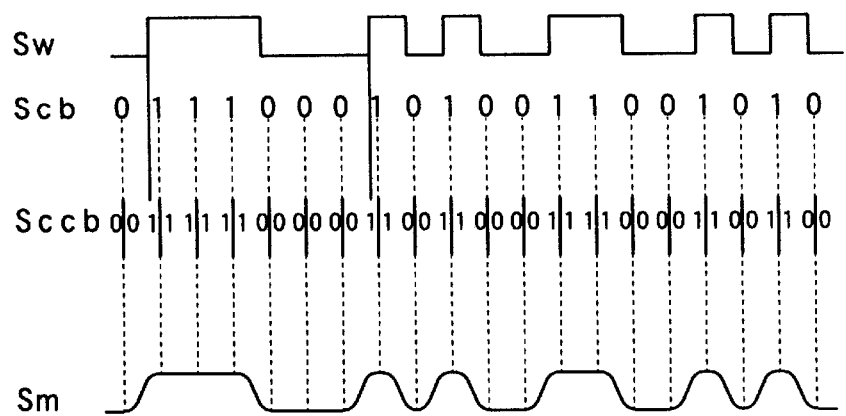
FIG. 7C is a timing chart (II) to describe an operation of the sine wave converter.

Then, the analog wave forms corresponding to the respective divided two bits are connected to all the divided two bits in the double clock signal Sccb to then generate the mark signal Sm shown at the bottom stage of FIG. 7C. As can be evident from FIG. 7C, in the generated mark signal Sm, a wave form at a portion corresponding to the above-mentioned judgment pattern has the wave form similar to that of the wobble W shown in FIGS. 1 to 3.

After that, the drive signal Sr corresponding to the mark signal Sm is generated as mentioned above. Moreover, the light beam BM corresponding to the drive signal Sr is generated and irradiated onto the original disc 14.

In addition, if a periodical signal to control the rotation number of a spindle motor in an information recording apparatus and an information reproducing apparatus, which are described later, is also recorded by using the wobble, a pattern of the wobble is a pattern corresponding to a signal in which the periodical signal and an address information are superimposed on each other.

(C) First Embodiment of Information Recording Apparatus

Next, a first embodiment of the information recording apparatus for recording the record information onto the optical disc 1 which respectively includes the groove tracks 1G and the land tracks 1L manufactured as mentioned above will be described below with reference to FIGS. 8, 9A and 9B.

Figure 8A:
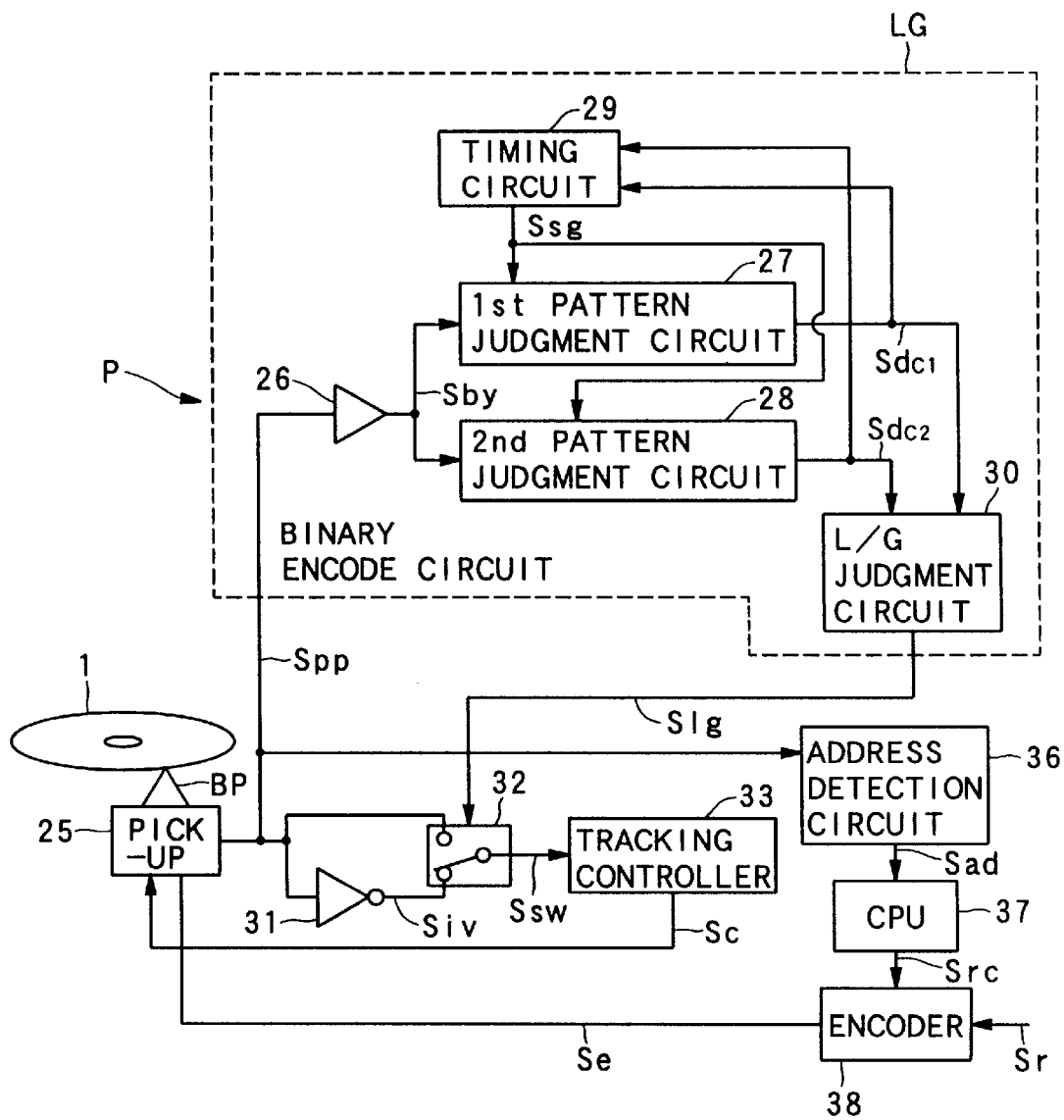
FIG. 8A is a block diagram showing a whole configuration of an information recording apparatus in the first embodiment.
Figure 8B:
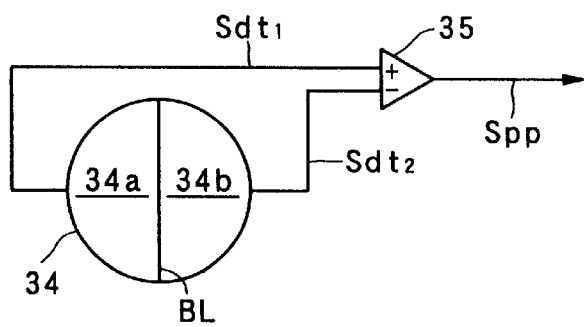
FIG. 8B is a block diagram showing a configuration of a portion of generating a push-pull signal in the information recording apparatus in the first embodiment.
Figure 9A:
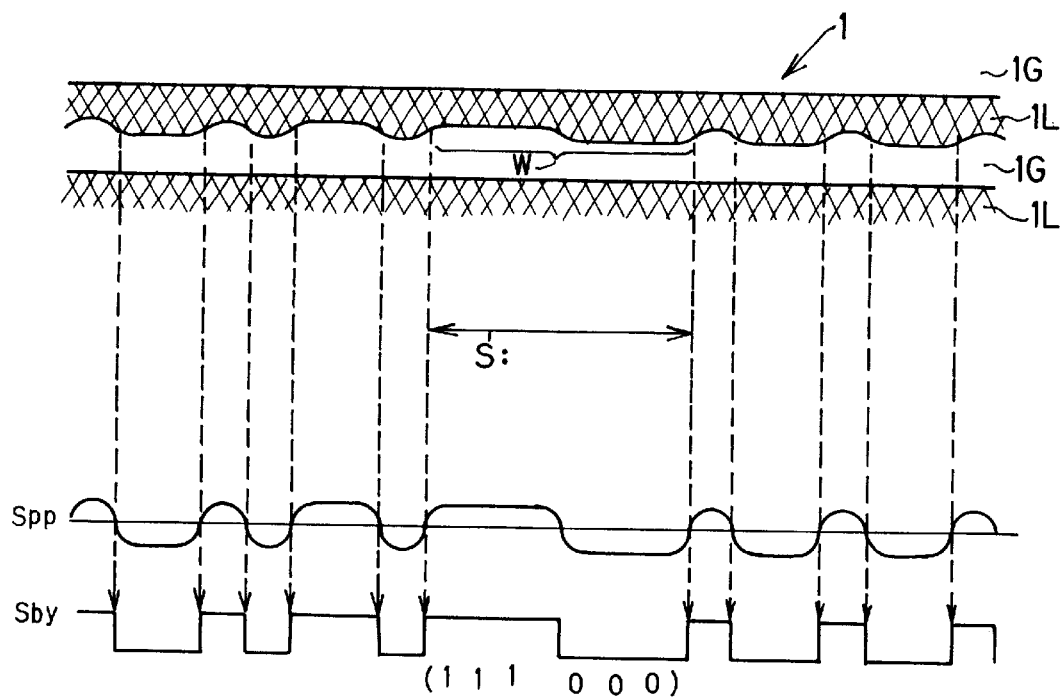
FIG. 9A is a diagram showing a relation between (i) wave forms of a push-pull signal and a binary signal generated when a light beam is irradiated onto a land track and (ii) a wobble on a corresponding optical disc.
Figure 9B:
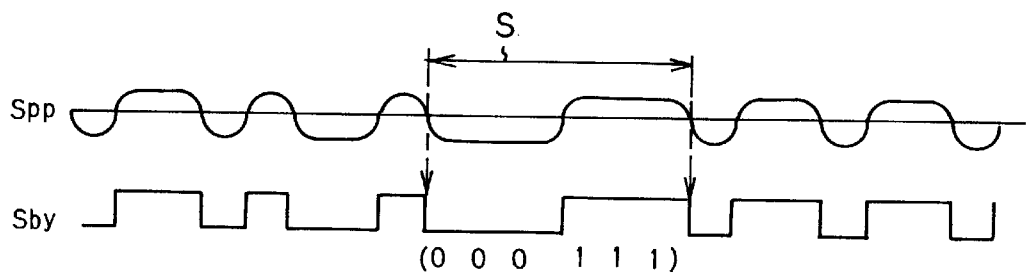
FIG. 9B is a diagram showing wave forms of a push-pull signal and a binary signal generated when a light beam is irradiated onto a groove track.

FIGS. 8A and 8B are block diagrams showing the schematic configuration of the information recording apparatus, and FIGS. 9A and 9B are diagrams describing the operations thereof.

As shown in FIG. 8A, an information recording apparatus R of the first embodiment is provided with: an optical pickup 25 serving as a detection device, a recording/reproducing device and a tracking servo device; an LG judgment section LG serving as one example of a judgement device; an inversion circuit 31; a switch 32; a tracking controller 33 serving as one example of a tracking control device; an address detection circuit 36; a CPU 37 and an encoder 38.

The LG judgment section LG is provided with: a binary encode circuit 26; a first pattern judgment circuit 27; a second pattern judgment circuit 28; a timing circuit 29; and an LG judgment circuit 30.

As shown in FIG. 8B, the optical pickup 25 is provided with: a detector constituted by partial detectors 34a and 34b; a subtracter 35; and a laser diode, an objective lens and so on (which are not illustrated).

Next, the whole operation of the information recording apparatus R is explained.

At first, the optical pickup 25 emits a light beam BP for recording from the laser diode (not shown) driven by a later-described encode signal Se so as to irradiate it onto the groove tracks 1G or the land tracks 1L on the optical disc 1.

Then, the detector 34 receives a reflection light from the optical disc 1 of the light beam BR. The detector 34 is divided into the partial detectors 34a and 34b by a division line BL parallel to a circumference direction of the optical disc 1. The partial detectors 34a and 34b receive the reflection light of the light beam BR, independently of each other, and respectively outputs light reception signals Sdt1 and Sdt2.

Next, the subtracter 35 subtracts the light reception signal Sdt2 from the light reception signal Sdt1, and then generates a push-pull signal Spp corresponding to the wobble formed in the groove track 1G. This push-pull signal Spp is modulated so as to correspond to the wobble on the basis of the above-mentioned wobble (including the above-mentioned wobble W). Also, this push-pull signal Spp is used by the tracking controller 33 as a tracking error signal indicative of a positional deviation (i.e., a positional deviation in a radius direction of the optical disc 1) between an irradiation position of the light beam BR and a position of the groove track 1G or the land track 1L.

On one hand, the LG judgment section LG judges whether the light beam BR is presently irradiated onto the groove track 1G or the land track 1L, in accordance with the generated push-pull signal Spp, and then generates a judgment signal Slg, and further outputs it to the switch 32.

On the other hand, the push-pull signal Spp is outputted to the inversion circuit 31 and also outputted to one input terminal of the switch 32. Then, the inversion circuit 31 inverts a polarity of the push-pull signal Spp, and then generates an inversion signal Siv, and outputs it to the other input terminal of the switch 32.

Then, the switch 32 selects either one of the push-pull signal Spp and the inversion signal Siv, in accordance with the judgment signal Slg, and then outputs it as a switch signal Ssw to the tracking controller 33.

After that, the tracking controller 33, in accordance with the inputted switch signal Ssw (which implies a tracking error signal), generates a drive signal Sc to drive the objective lens (this is not shown and is intended to collect the light beams BR on the optical disc 1) within the optical pickup 25, in the radius direction of the optical disc 1, and then outputs it to an actuator mounted in the objective lens (i.e., an actuator to drive the objective lens in the radius direction of the optical disc 1).

Accordingly, a push-pull signal Spp having a proper phase is selected depending on whether the light beam BR is irradiated onto the groove track 1G or the land track 1L, and thereby a proper tracking control is carried out.

In parallel with this, the address detection circuit 36 detects the address information included in the push-pull signal Spp, and then generates an address detection signal Sad, and further outputs it to the CPU 37.

Then, the CPU 37 obtains an address on the optical disc 1 onto which the light beam BR is presently irradiated, in accordance with the inputted address detection signal Sad, and then generates a control signal Src to control the encoder 38 so that a record information to be recorded at a position on the optical disc 1 indicated by the obtained address is recorded at this position, and further outputs it to the encoder 38.

Accordingly, the encoder 38 modulates a record signal Sr including the record information to be recorded that is inputted from external portion, and generates the encode signal Se to control the laser diode (not shown) in the optical pickup 25 so as to record the record information corresponding to the address indicated by the control signal Src at that address.

After that, the light beam BR having a light intensity corresponding to the encode signal Se is irradiated onto the groove track 1G or the land track 1L, as mentioned above. Accordingly, an information pit corresponding to the record information is formed on the groove track 1G or the land track 1L, so that the record information is recorded onto the optical disc 1.

Next, the operation of the LG judgment section LG is explained with reference to FIGS. 8A, 8B, 9A and 9B.

FIG. 9A is a diagram showing a relation between wave forms of the push-pull signal Spp and a later-described binary signal Sby generated when the light beam BR is irradiated onto the land track 1L and the wobble on the corresponding optical disc 1. FIG. 9B is a diagram showing wave forms of the push-pull signal and the binary signal Sby generated when the light beam BR is irradiated onto the groove track 1G.

An amplitude level of the push-pull signal Spp inputted to the LG judgment section LG is changed due to the generating mechanism thereof shown in FIG. 8B, correspondingly to the wobble on the optical disc 1 as shown in FIG. 9A. Also as for the wobble W within the judgment area S, an amplitude level of the wave form of the corresponding push-pull signal Spp is changed in correspondence with the change of the wobbling in the wobble W. Also, a phase of the push-pull signal Spp generated when the light beam BR is irradiated onto the land track 1L and a phase of the push-pull signal Spp generated when the light beam BR is irradiated onto the groove track 1G are inverse to each other, as for the wobble W at the same position, as can be evident from the comparison between FIGS. 9A and 9B.

The binary encode circuit 26 converts such a push-pull signal Spp into a binary value by using a predetermined threshold, and generates the binary signal Sby, and then outputs it to the first pattern judgment circuit 27 and the second pattern judgment circuit 28.

Here, the wobble in the optical disc 1 of the first embodiment is the pattern in which the judgment pattern thereof corresponds to "111000". Thus, a digital value of the binary signal Sby generated when the light beam BR is irradiated onto the land track 1L is a value corresponding to "111000" as shown in FIG. 9A. On the other hand, a digital value generated when the light beam BR is irradiated onto the groove track 1G is a value corresponding to "000111" as shown in FIG. 9B.

The first pattern judgment circuit 27 uses a gate signal Ssg outputted by the timing circuit 29 to extract the binary signal Sby at a timing corresponding to the wobble W. Moreover, the first pattern judgment circuit 27 judges that pattern, and if it is "111000", generates a judgment signal Sdc1 which becomes at a "HIGH" level, and further outputs it to the LG judgment circuit 30 and the timing circuit 29.

On the other hand, the second pattern judgment circuit 28 uses the gate signal Ssg, similarly to the first pattern judgment circuit 27, to extract the binary signal Sby at a timing corresponding to the wobble W. Moreover, the second pattern judgment circuit 28 judges that pattern, and if it is "000111", generates a judgment signal Sdc2 which becomes at a "HIGH" level, and further outputs it to the LG judgment circuit 30 and the timing circuit 29.

Then, on the basis of the judgment signals Sdc1 and Sdc2, the LG judgment circuit 30 judges that the light beam BR is irradiated onto the land track 1L if only the judgment signal Sdc1 becomes at the "HIGH" level, and then generates a judgment signal Slg indicative of that fact, and further outputs it to the switch 32. On the other hand, if only the judgment signal Sdc2 becomes at the "HIGH" level, the LG judgment circuit 30 judges that the light beam BR is irradiated onto the groove track 1G, and then generates a judgment signal Slg indicative of that fact, and similarly outputs it to the switch 32.

At this time, the timing circuit 29 generates the gate signal Ssg which becomes at the "HIGH" level at the timing of the occurrence of the wobble W, in accordance with the judgment signals Sdc1 and Sdc2, and then outputs it to the first pattern judgment circuit 27 and the second pattern judgment circuit 28. This timing circuit 29 generates the gate signal Ssg so as to detect only the binary signal Sby corresponding to the wobble W without noise, in the first pattern judgment circuit 27 and the second pattern judgment circuit 28. In addition, the reason why the operation of the timing circuit 29 enables the generation of the gate signal Ssg indicative of the timing of the binary signal Sby corresponding to the wobble W is as follows. That is, the judgment area S having the wobble W is formed immediately after the position where the groove track 1G and the land track 1L are exchanged, in the optical disc 1, as shown in FIG. 1. Hence, the binary signal Sby corresponding to the wobble W is also detected periodically (namely, at a rate of once per one rotation of the optical disc 1).

In addition, both of the judgment signals Sdc1 and Sdc2 are never at the "HIGH" levels simultaneously. Thus, if such judgment signals Sdc1 and Sdc2 are generated by some rare accident, the LG judgment circuit 30 judges that such a generation is erroneous, and then outputs the judgment signal Slg until that time while maintaining the content thereof.

Moreover, if neither one of the judgment signals Sdc1 and Sdc2 is at the "HIGH" level at the timing when the light beam BR is irradiated onto the wobble W, the LG judgment circuit 30 judges that the wobble W cannot be detected, and similarly outputs the judgment signal Slg until that time while maintaining the content thereof.

(D) First Embodiment of Information Reproducing Apparatus

A first embodiment of an information reproducing apparatus for reproducing the record information from the optical disc 1 on which the record information is recorded by the above-mentioned information recording apparatus R will be described below with reference to FIGS. 10A and 10B.

Figure 10A:
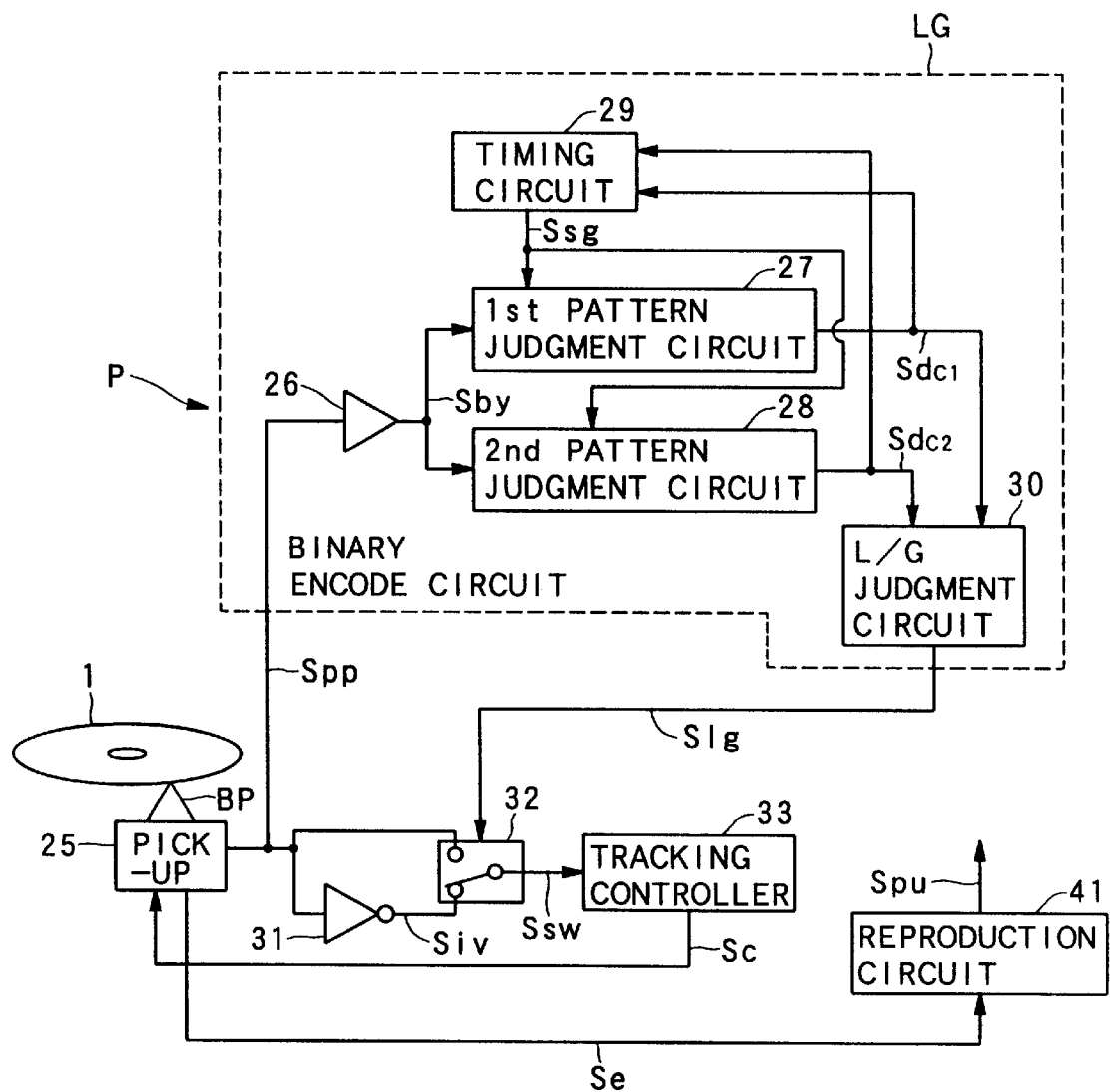
FIG. 10A is a block diagram showing a whole configuration of an information reproducing apparatus of the first embodiment.
Figure 10B:
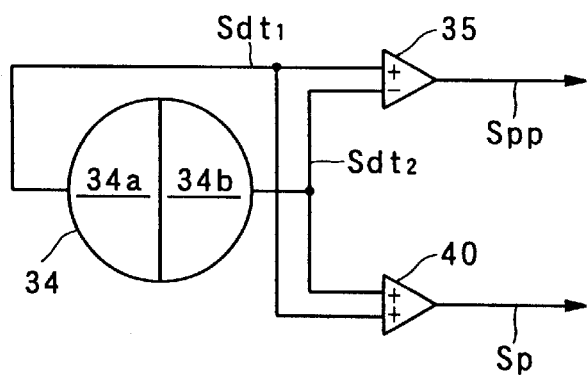
FIG. 10B is a block diagram showing a configuration of a portion of generating a push-pull signal and a detection signal in the information reproducing apparatus of the first embodiment.

FIGS. 10A and 10B are block diagrams showing the schematic configuration of the information reproducing apparatus. In FIGS. 10A and 10B, the same constitutional elements as those in FIG. 8 carry the same reference numerals, and the explanations thereof are omitted.

As shown in FIG. 10A, an information reproducing apparatus P of the first embodiment is provided with an optical pickup 25', an LG judgment section LG, an inversion circuit 31, a switch 32, a tracking controller 33 and a reproduction circuit 41.

In FIG. 10A, the LG judgment section LG is provided with a binary encode circuit 26, a first pattern judgment circuit 27, a second pattern judgment circuit 28, a timing circuit 29 and an LG judgment circuit 30, similarly to the LG judgment section LG within the information recording apparatus R (FIG. 8A).

As shown in FIG. 10B, the optical pickup 25' is provided with an adder 40, in addition to a detector 34, a subtracter 35 and the like, similarly to the optical pickup 25 within the information recording apparatus R (FIG. 8B).

Next, the operation of the information reproducing apparatus P is explained.

At first, the optical pickup 25' emits a light beam BP (i.e., a light beam BP for reproducing the record information) having a constant light intensity established for the information reproduction, and then irradiates it onto the groove tracks IG or the land tracks 1L on the optical disc 1 on which the record information is recorded.

Then, the detector 34 receives a reflection light from the optical disc 1 of the light beam BP, similarly to the case of the information recording apparatus R, and outputs the light reception signals Sdt1 and Sdt2. At this time, the light reception signals Sdt1 and Sdt2 include the information corresponding to the record information already recorded on the optical disc 1, in addition to the above-mentioned address information.

Next, the subtracter 35 generates a push-pull signal Spp corresponding to a wobble formed in the groove track 1G, similarly to the case of the information recording apparatus R.

In parallel with this, the adder 40 adds the light reception signals Sdt1 and Sdt2 to each other, and generates a detection signal Sp corresponding to the already-recorded record information, and then outputs it to the reproduction circuit 41.

On one hand, the LG judgment section LG judges whether the light beam BP is presently irradiated onto the groove track 1G or the land track 1L, similarly to the case of the information recording apparatus R, and then generates the judgment signal Slg, and further outputs it to the switch 32. In addition, the detailed operations of the LG judgment section LG are similar to those of the information recording apparatus R. Thus, the detailed descriptions are omitted.

On the other hand, the switch 32 selects either one of the push-pull signal Spp and the inversion signal Siv, in accordance with the judgment signal Slg from the LG judgment section LG, similarly to the case of the information recording apparatus R, and then outputs it as the switch signal Ssw to the tracking controller 33.

After that, the tracking controller 33 generates the drive signal Sc in accordance with the inputted switch signal Ssw, similarly to the case of the information recording apparatus R, and then outputs it to the actuator disposed in the objective lens within the optical pickup 25'.

Accordingly, the push-pull signal Spp having the proper phase is selected depending on whether the light beam BP is irradiated onto the groove track 1G or the land track 1L, and thereby the proper tracking control is carried out.

In parallel with this, the reproduction circuit 41 performs an amplifying process, a demodulating process and the like on a detection signal Sp from the adder 40, and then generates a reproduction signal Spu corresponding to the record information recorded on the optical disc 1, and further outputs it to an external speaker, display and the like.

As mentioned above, according to the optical disc 1, the optical disc manufacturing apparatus M, the information recording apparatus R and the information reproducing apparatus P in the first embodiment, the wobble W to judge whether the light beam BR or BP is irradiated onto the groove track 1G or the land track 1L is formed only on the one side wall 1G' in the groove track 1G. Thus, the different push-pull signal Spp with regard to the wobble W is obtained between the case when the light beam BR or BP is irradiated onto the groove track 1G and the case when it is irradiated onto the land track 1L. Hence, when the record information is recorded/reproduced, it is possible to accurately judge whether the light beam BR or BP is moving on the groove track 1G or the land track 1L.

Moreover, since the wobble W is formed in the groove track 1G or the land track 1L without the intermittence, the record information can be recorded/reproduced without the breakdown of continuity.

Also, the wobble of the different pattern is further formed in an area other than the judgment area S in which the wobble W on the side wall 1G' of the groove track 1G is formed. Thus, for example, the periodical signal in relation to the movement of the optical disc 1 and the like can be recorded as the wobble on the side wall IG' of the groove track 1G having the period corresponding to the periodical signal and the like without reducing the record capacity of the record information in the groove track 1G or the land track 1L.

Furthermore, the address information is recorded by using a wobble other than the wobble W. Thus, the address information can be recorded and further the wobble W can be formed without reducing the record capacity of the record information in the groove track 1G or the land track 1L.

Moreover, the groove tracks 1G and the land tracks 1L are formed such that the record information is recorded/reproduced while the light beam BR or BP is moving alternately between each groove track 1G and each land track 1L for each rotation of the optical disc 1. Thus, the record information can be recorded/reproduced at a high density while maintaining the continuity of the record information to be continuously recorded/reproduced.

The wobble W is formed adjacently to the boundary portion in the circumference direction of the optical disc 1 between the groove track 1G and the land track 1L. Thus, it is possible to accurately judge whether the light beam BR or BP is irradiated onto the groove track 1G or the land track 1L immediately after the groove track 1G and the land track 1L are exchanged.

In addition, the relation between the judgment pattern of the wobble W and the synchronization data D1 in the wobbling address frame D (refer to FIG. 5) is not especially described in the first embodiment. However, since the judgment pattern is the pattern different from the patterns of the other wobbles, the judgment pattern can be established as the pattern indicative of the synchronization data D1.

Moreover, in the first embodiment, the case is described in which the wobble in the area other than the judgment area S is used to record the address information and the like. However, if another method other than that case can record the address information and the like on the optical disc, it is not necessary to form the wobble in the groove track 1G in the area other than the judgment area S. Also in this case, it is possible to create the wobble W only within the judgment area S to thereby provide the effect similar to that of the first embodiment.

(II) Second Embodiment

A second embodiment according to the present invention will be described below with reference to FIGS. 11, 12A and 12B.

Figure 11:
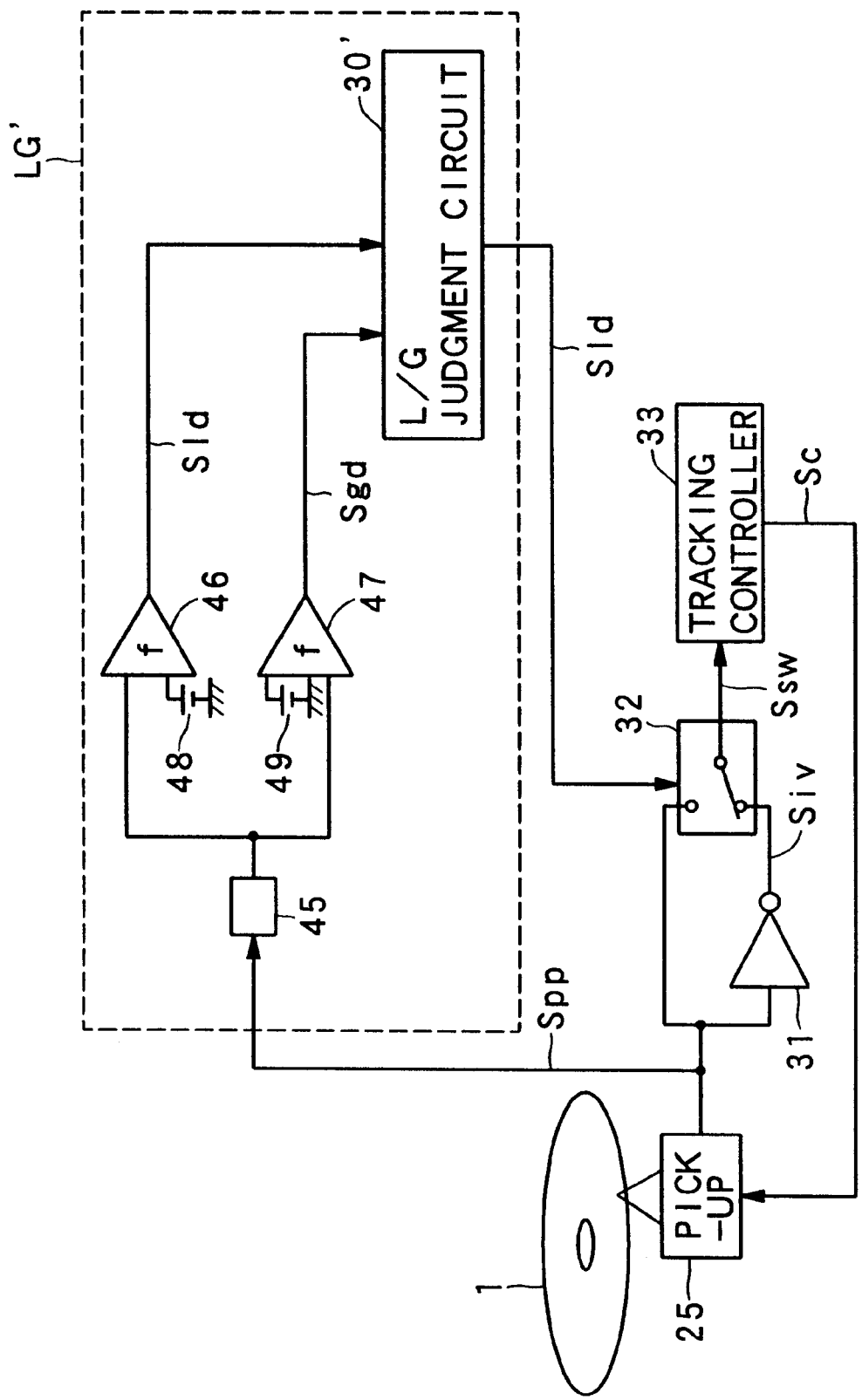
FIG. 11 is a block diagram showing a schematic configuration of an LG judgment section etc., of a second embodiment.

FIG. 11 is a block diagram showing a configuration of a portion related to a tracking control and an LG judgment section in the second embodiment. FIGS. 12A and 12B are diagrams describing the operations thereof. Moreover, FIG. 12A is a diagram showing a relation between wave forms of a push-pull signal Spp, an integration signal Sv and a land judgment signal Sld, which are generated when the light beam BR or BP is irradiated onto a land track 1L as described later in detail, and a wobble on a corresponding optical disc 1. FIG. 12B is a diagram showing wave forms of a push-pull signal Spp, an integration signal Sv and a groove judgment signal Sgd, which are generated when the light beam BR or BP is irradiated onto a groove track 1G as described later in detail.

In the first embodiment, "111000" of the pattern that does not appear as the other wobble is used as the judgment pattern of the wobble W. However, in the second embodiment, a pattern corresponding to one wave length of a mere sine wave is used as the judgment pattern.

Here, a configuration of an information recording apparatus in the second embodiment is similar to that of the information recording apparatus R in the first embodiment, except for a configuration of an LG judgment section. Moreover, a configuration of an information reproducing apparatus in the second embodiment is similar to that of the information reproducing apparatus P in the first embodiment, except for a configuration of an LG judgment section. Thus, only the configuration and the operation of the LG judgment section in the second embodiment are described in the following explanation, and the explanations of the other portions are omitted.

At first, the configuration of an optical disc 1' according to the second embodiment is described with reference to FIG. 12A. In the optical disc 1', a wobble is not formed in an area other than a judgment area S'. Moreover, a wobble W'having a judgment pattern corresponding to one wave length of a sine wave is formed within the judgment area S' by using only one side wall 1G' of the groove track 1G. Then, if this wobble W' is detected, the later-described LG judgment section in the second embodiment detects a fact that a phase of the push-pull signal Spp as the detected result of the wobble W' in a case when the light beam reaches the judgment area S' while moving on the land track 1L is opposite to that in a case when the light beam reaches the judgment area S' while moving on the groove track 1G. Accordingly, it is detected whether the light beam BR or BP is moving on the groove track 1G or the land track 1L when the information is recorded or reproduced.

Figure 12A:
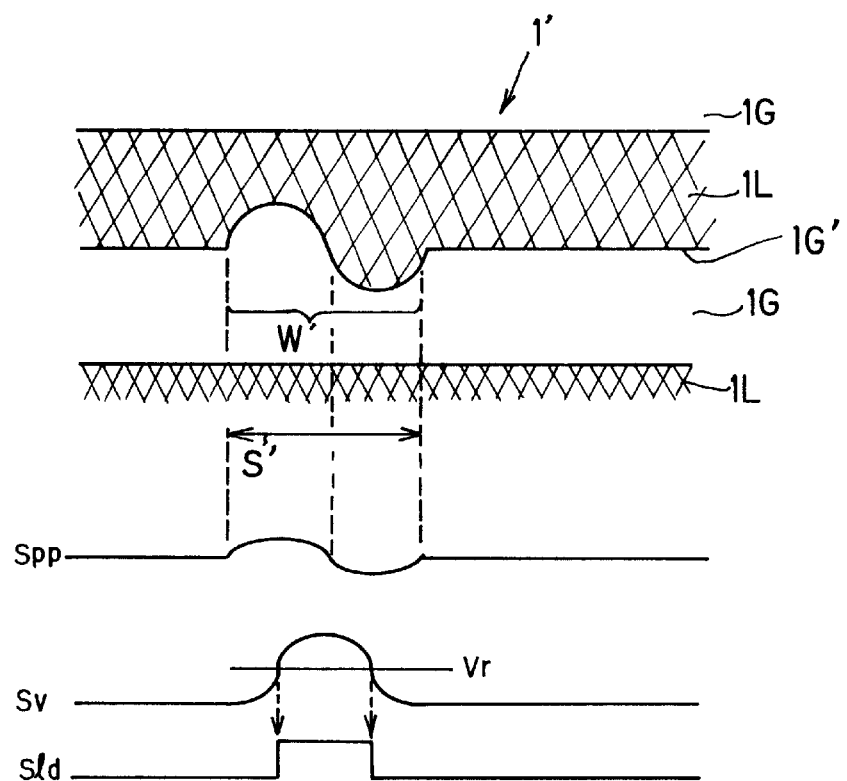
FIG. 12A is a diagram showing a relation between (i) wave forms of a push-pull signal and an integration signal generated when a light beam is irradiated onto a land track and (ii) a wobble on a corresponding optical disc, in an operation of the LG judgment section of the second embodiment.

In addition, as an optical disc manufacturing apparatus in the second embodiment for manufacturing the optical disc 1' shown in FIG. 12A, only a modification that in the mark signal generation circuit 10 shown in FIG. 4, a mark signal Sm having a wave form corresponding to one wave length of a sine wave is generated at a timing of the formation of the wobble W' and it is outputted to the record circuit 11, is applied to the optical disc manufacturing apparatus M in the first embodiment. Accordingly, this optical disc manufacturing apparatus M can be used as the optical disc manufacturing apparatus in the second embodiment.

Next, the configurations and the operations with regard to the tracking control and the LG judgment section in the second embodiment will be described below with reference to FIGS. 11, 12A and 12B.

At first, as shown in FIG. 11, an LG judgment section LG' in the second embodiment is provided with an integration circuit 45, comparators 46 and 47, standard voltage generators 48 and 49 and an LG judgment circuit 30'. In addition, an optical pickup 25, an inversion circuit 31, a switch 32 and a tracking controller 33 have the functions similar to those shown in FIG. 8. Thus, the detailed explanations thereof are omitted.

Next, the operation of the LG judgment section LG' will be described below.

In the push-pull signal Spp inputted to the LG judgment section LG', in correspondence with the wobble W' within the judgment area S' as shown in FIG. 11A and thus in correspondence with the variation of the wobbling in the wobble W', an amplitude level of its wave form is changed at the period similar to that of the variation, by virtue of the generating mechanism similar to that shown in FIG. 8B. At this time, since the wobble is not formed in the area other than the judgment area S', a push-pull signal Spp corresponding to that area is not detected. Also, a phase of the push-pull signal Spp generated when the light beam BR or BP is irradiated onto the land track 1L and a phase of the push-pull signal Spp generated when the light beam BR or BP is irradiated onto the groove track 1G are inverse to each other, as for the wobble W' at the same position, as can be evident from the comparison between FIGS. 12A and 12B.

Figure 12B:
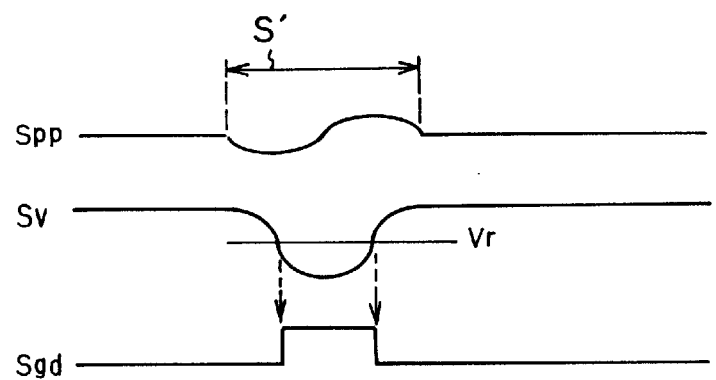
FIG. 12B is a diagram showing wave forms of a push-pull signal and an integration signal generated when a light beam is irradiated onto a groove track in the second embodiment.

The integration circuit 45 integrates such push-pull signals Spp, respectively, and generates integration signals Sv shown in FIGS. 12A and 12B, respectively, and outputs it to the comparators 46 and 47.

Here, in the wobble W' in the optical disc 1' in the second embodiment, the judgment pattern thereof has the wave form corresponding to one wave length of a sine wave. Thus, if a wave form of the integration signal Sv generated when the light beam BR or BP is irradiated onto the land track 1L and a wave form of the integration signal Sv generated when the light beam BR or BP is irradiated onto the groove track 1G are compared with each other, the phases thereof are opposite to each other, as shown in FIGS. 12A and 12B.

The comparator 46 compares the inputted integration signal Sv with a constant standard voltage Vr outputted by the standard voltage generator 48 (a standard voltage Vr established to detect the integration signal Sv corresponding to the wobble W'). The comparator 46 generates a land judgment signal Sld which becomes at the "HIGH" level only if an output level of the integration signal Sv is higher than the standard voltage Vr, as shown in FIG. 12A, and then outputs it to the LG judgment circuit 30'. Here, due to the above-mentioned generating mechanism of the land judgment signal Sld, the land judgment signal Sld becomes at the "HIGH" level and is outputted only if the light beam BR or BP is irradiated onto the land track 1L.

On the other hand, the comparator 47 compares the inputted integration signal Sv with a constant standard voltage Vr outputted by the standard voltage generator 49, and generates a groove judgment signal Sgd which becomes at the "HIGH" level only if an output level of the integration signal Sv is lower than the standard voltage Vr, as shown in FIG. 12B, and then outputs it to the LG judgment circuit 30'. Here, due to the above-mentioned generating mechanism of the groove judgment signal Sgd, the groove judgment signal Sgd becomes at the "HIGH" level and is outputted only if the light beam BR or BP is irradiated onto the groove track 1G.

Accordingly, on the basis of the land judgment signal Sld and the groove judgment signal Sgd, the LG judgment circuit 30' judges that the light beam BR or BP is irradiated onto the land track 1L if the land judgment signal Sld becomes at the "HIGH" level, and then generates a judgment signal Slg indicative of that fact, and further outputs it to the switch 32. On the other hand, if the groove judgment signal Sgd becomes at the "HIGH" level, the LG judgment circuit 30' judges that the light beam BR or BP is irradiated onto the groove track 1G, and then generates a judgment signal Slg indicative of that fact, and similarly outputs it to the switch 32.

In addition, both of the land judgment signal Sld and the groove judgment signal Sgd are never at the "HIGH" level simultaneously. Thus, if such a land judgment signal Sld and a groove judgment signal Sgd are generated by some rare accident, the LG judgment circuit 30' judges that it is erroneous, and then outputs the judgment signal Slg until that time while maintaining the content thereof.

Moreover, if neither one of the land judgment signal Sld and the groove judgment signal Sgd is at the "HIGH" level at the timing when the light beam BR or BP is irradiated onto the wobble W', the LG judgment circuit 30' judges that the wobble W' cannot be detected, and similarly outputs the judgment signal Slg until that time while maintaining the content thereof.

After that, due to the switching operation based on the judgment signal Slg of the switch 32, either one of the push-pull signal Spp and the inversion signal Siv is inputted to the tracking controller 33 to thereby generate the drive signal Sc.

As mentioned above, according to the optical disc 1', the optical disc manufacturing apparatus, the information recording apparatus and the information reproducing apparatus in the second embodiment, it is possible to use the simple configuration to judge whether the light beam BR or BP is irradiated onto the groove track 1G or the land track 1L, since the judgment pattern of the wobble W' is the pattern corresponding to one period of the sine wave, in addition to the effects of the optical disc 1, the optical disc manufacturing apparatus M, the information recording apparatus R and the information reproducing apparatus P in the first embodiment.

(III) Third Embodiment

A third embodiment according to the present invention will be described below with reference to FIGS. 13, 14A and 14B.

Figure 13:
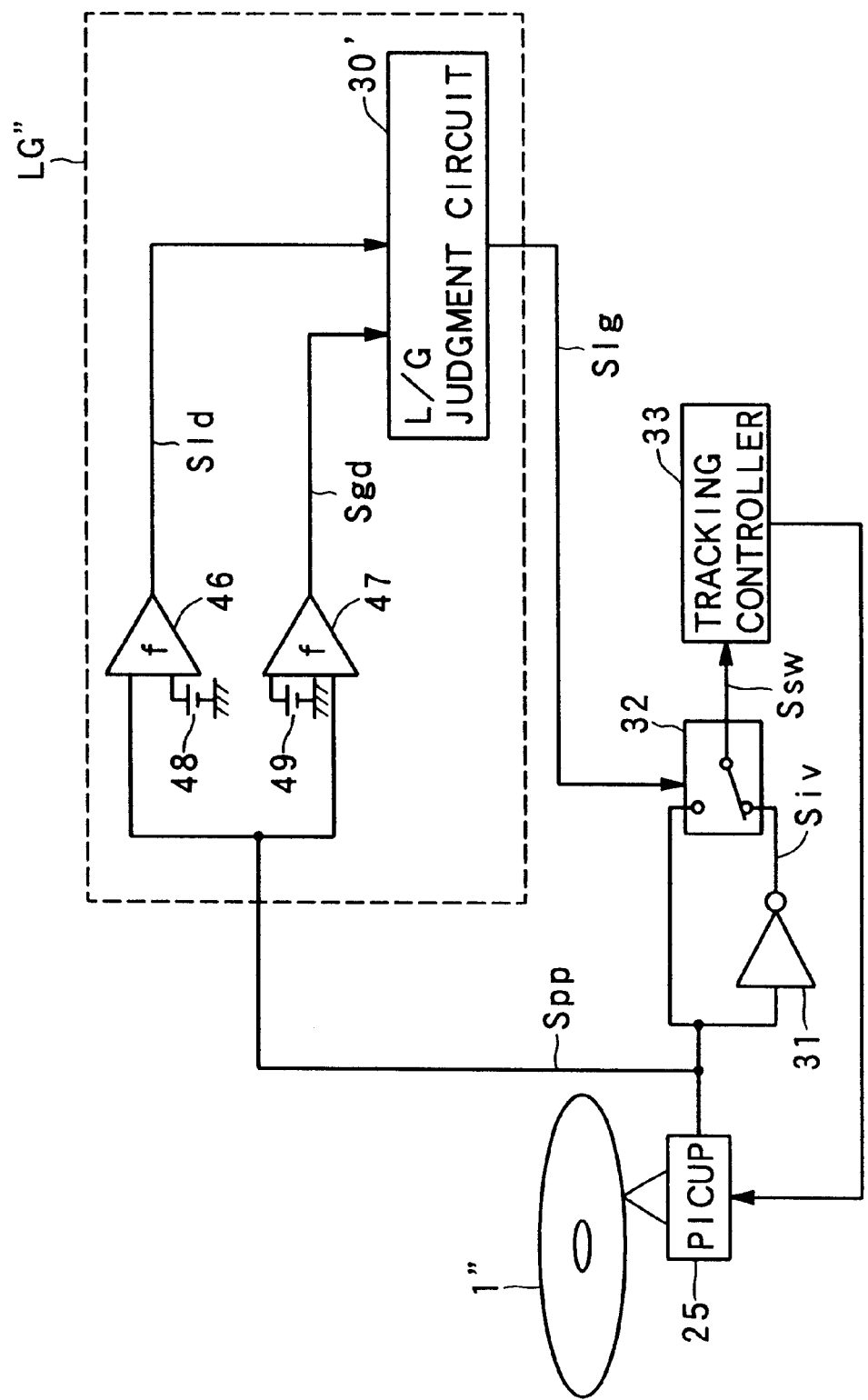
FIG. 13 is a block diagram showing a schematic configuration of an LG judgment section etc., of a third embodiment.

FIG. 13 is a block diagram showing a configuration of a portion related to a tracking control and an LG judgment section in the third embodiment. FIGS. 14A and 14B are diagrams describing the operations thereof. Moreover, FIG. 14A is a diagram showing a relation between wave forms of the push-pull signal Spp and a later-described land judgment signal Sld generated when the light beam BR or BP is irradiated onto the land track 1L and a wobble on a corresponding optical disc 1". FIG. 14B is a diagram showing wave forms of the push-pull signal and a later-described groove judgment signal Sgd generated when the light beam BR or BP is irradiated onto the groove track 1G.

Figure 14A:
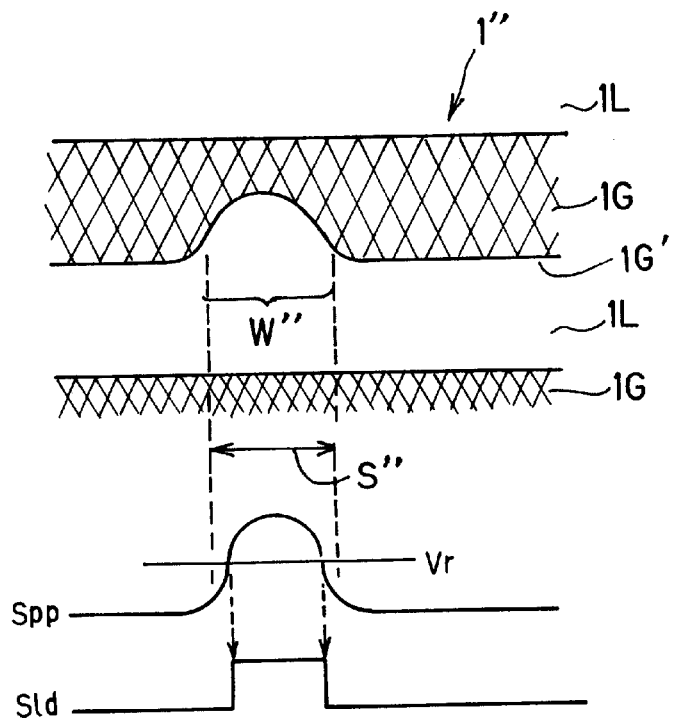
FIG. 14A is a diagram showing a relation between (i) a wave form of a push-pull signal generated when a light beam is irradiated onto a land track and (ii) a wobble on a corresponding optical disc, in an operation of the LG judgment section of the third embodiment.
Figure 14B:
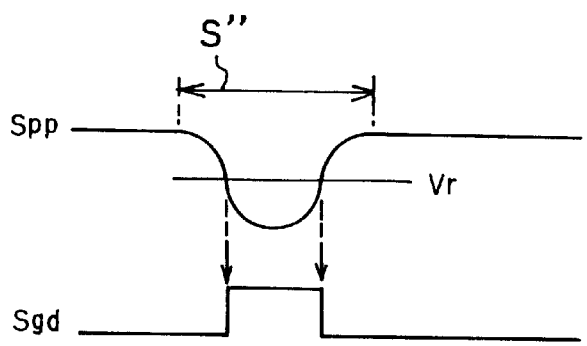
FIG. 14B is a diagram showing a wave form of a push-pull signal generated when a light beam is irradiated onto a groove track in the third embodiment.

Here, in FIGS. 13, 14A and 14B, the same constitutional elements as those in the second embodiment shown in FIGS. 11, 12A and 12B carry the same reference numerals and the explanations thereof are omitted.

In the second embodiment, the pattern corresponding to one wave length of the sine wave is used as the judgment pattern of the wobble W'. However, in the third embodiment, a pattern corresponding to a half-wave length is used as the judgment pattern.

Here, a configuration of an information recording apparatus in the third embodiment is similar to that of the information recording apparatus R in the first embodiment, except for a configuration of an LG judgment section. Moreover, a configuration of an information reproducing apparatus in the third embodiment is similar to that of the information reproducing apparatus P in the first embodiment, except for a configuration of an LG judgment section. Thus, only the configuration and the operation of the LG judgment section in the third embodiment are described in the following explanation, and the explanations of the other portions are omitted.

At first, the configuration of an optical disc 1" according to the third embodiment is described with reference to FIG. 14A. In the optical disc 1", a wobble is not formed in an area other than a judgment area S". Moreover, a wobble W" having a judgment pattern corresponding to a half-wave length of a sine wave is formed within the judgment area S" by using only one side wall 1G' of the groove track 1G. Then, if this wobble W" is detected, the later-described LG judgment section in the third embodiment detects a fact that a phase of the push-pull signal Spp as the detected result of the wobble W" in a case when the light beam reaches the judgment area S" while moving on the land track 1L is opposite to that in a case when the light beam reaches the judgment area S" while moving on the groove track 1G. Accordingly, it is detected whether the light beam BR or BP is moving on the groove track 1G or the land track 1L when the information is recorded/reproduced.

As an optical disc manufacturing apparatus in the third embodiment for manufacturing the optical disc 1" shown in FIG. 14A, only a modification that in the mark signal generation circuit 10 shown in FIG. 4, a mark signal Sm having a wave form corresponding to a half-wave length of a sine wave is generated at a timing of the formation of the wobble W" and it is outputted to the record circuit 11 is applied to the optical disc manufacturing apparatus M in the first embodiment. Accordingly, this optical disc manufacturing apparatus M can be used as the optical disc manufacturing apparatus in the third embodiment.

Next, the configurations and the operations with regard to the tracking control and the LG judgment section in the third embodiment will be described below with reference to FIGS. 13, 14A and 14B.

At first, as shown in FIG. 13, an LG judgment section LG" in the third embodiment is provided with comparators 46 and 47, standard voltage generators 48 and 49 and an LG judgment circuit 30'. In addition, an optical pickup 25, an inversion circuit 31, a switch 32 and a tracking controller 33 have the functions similar to those shown in FIG. 8. Thus, the detailed explanations thereof are omitted.

Next, the operation of the LG judgment section LG" will be described below.

In the push-pull signal Spp inputted to the LG judgment section LG", in correspondence with a wobble W" within a judgment area S" as shown in FIG. 14A and thus in correspondence with a variation of a wobbling in the wobble W", an amplitude level of its wave form is changed at the period similar to that of the variation by virtue of the generating mechanism similar to that shown in FIG. 8B. At this time, since the wobble is not formed in the area other than the judgment area S", a push-pull signal Spp corresponding to that area is not detected. Also, a phase of the push-pull signal Spp generated when the light beam BR or BP is irradiated onto the land track 1L and a phase of the push-pull signal Spp generated when the light beam BR or BP is irradiated onto the groove track 1G are inverse to each other, as for the wobble W" at the same position, as can be evident from the comparison between FIGS. 14A and 14B.

The comparator 46 compares the inputted push-pull signal Spp with a constant standard voltage Vr outputted by the standard voltage generator 48 (a standard voltage Vr established to detect an integration signal Sv corresponding to the wobble W"). The comparator 46 generates a land judgment signal Sld which becomes at the "HIGH" level only if an output level of the push-pull signal Spp is higher than the standard voltage Vr, as shown in FIG. 14A, and then outputs it to the LG judgment circuit 30'. Here, due to the above-mentioned generating mechanism of the land judgment signal Sld, the land judgment signal Sld becomes at the "HIGH" level and is outputted only if the light beam BR or BP is irradiated onto the land track 1L.

On the other hand, the comparator 47 compares the inputted push-pull signal Spp with a constant standard voltage Vr outputted by the standard voltage generator 49, and generates a groove judgment signal Sgd which becomes at the "HIGH" level only if an output level of the push-pull signal Spp is lower than the standard voltage Vr, as shown in FIG. 14B, and then outputs it to the LG judgment circuit 30'. Here, due to the above-mentioned generating mechanism of the groove judgment signal Sgd, the groove judgment signal Sgd becomes at the "HIGH" level and is outputted only if the light beam BR or BP is irradiated onto the groove track 1G.

Accordingly, similarly to the case of the second embodiment, the LG judgment circuit 30', in accordance with the land judgment signal Sld and the groove judgment signal Sgd, judges that the light beam BR or BP is irradiated onto the land track 1L if the land judgment signal Sld becomes at the "HIGH" level, and then generates a judgment signal Slg indicative of that fact, and further outputs it to the switch 32. On the other hand, if the groove judgment signal Sgd becomes at the "HIGH" level, the LG judgment circuit 30' judges that the light beam BR or BP is irradiated onto the groove track 1G, and then generates a judgment signal Slg indicative of that fact, and similarly outputs it to the switch 32.

After that, due to the switching operation based on the judgment signal Slg of the switch 32, any one of the push-pull signal Spp and the inversion signal Siv is inputted to the tracking controller 33 to thereby generate the drive signal Sc.

As mentioned above, according to the optical disc 1", the optical disc manufacturing apparatus, the information recording apparatus and the information reproducing apparatus in the third embodiment, it is possible to use the simpler configuration to judge whether the light beam BR or BP is irradiated onto the groove track 1G or the land track 1L, since the judgment pattern of the wobble W" is the pattern corresponding to the half-period of the sine wave, in addition to the effects of the optical disc 1, the optical disc manufacturing apparatus M, the information recording apparatus R and the information reproducing apparatus P in the first embodiment.

In addition, the case in which a wobble other than the wobble W' or W" is not formed is described in the second or third embodiment. However, other than this case, a wobble corresponding to a periodical signal to extract an address information or a record clock signal or the like may be formed on the groove track 1G (only one side wall 1G' or both the side walls) in the area other than the judgment area S' or S".

Also, in the respective embodiments, the case is described in which the judgment area S, S'or S" is formed at the position on the optical disc immediately after the track to which the light beam is irradiated is exchanged from the groove track 1G to the land track 1L (in other words, immediately after it is exchanged from the land track 1L to the groove track 1G). However, other than this case, a plurality of judgment areas S, S'or S" may be generated in another area of the optical disc (another area other than the position at which the type of the track is exchanged). In this case, the configuration that the judgment area S, S'or S" is periodically arranged as the whole optical disc is convenient since the wobble within the judgment area S, S'or S" can be used for a synchronous signal and the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.10-289710 filed on Oct. 12, 1998 including the specification, claims, drawings and summary is incorporated herein by reference in its entirety.

What is claimed is:

1. A record medium comprising:

a main body;

a groove track formed on said main body, as one track for recording information onto which a light beam for recording and/or reproducing the information is irradiated; and a land track formed on said main body, which is adjacent to said groove track, as another track for recording the information onto which the light beam for recording and/or reproducing the information is irradiated, wherein a judgment wobble, which has a judgment pattern to judge whether the light beam is irradiated onto said groove track or said land track, is formed on only one side wall of said groove track.

2. A record medium according to claim 1, wherein a wobble having another pattern different from said judgment pattern is formed in an area of said only one side wall other than an area where said judgment wobble is formed.

3. A record medium according to claim 2, wherein said another pattern corresponds to address information indicative of a record position on said record medium.

4. A record medium according to claim 1, wherein said main body is shaped in a disc, and said groove track and said land track are formed such that the information is recorded and/or reproduced while the light beam is relatively moving on said groove track and said land track alternately for each rotation of said record medium.

5. A record medium according to claim 4, wherein said judgment wobble is formed adjacent to a boundary between said land track and said groove track in a circumference direction of said record medium.

6. A record medium according to claim 1, wherein no wobble is formed in an area of said only one side wall other than an area where said judgment wobble is formed.

7. A record medium manufacturing apparatus for manufacturing a record medium comprising: a main body; a groove track formed on said main body, as one track for recording information onto which a light beam for recording and/or reproducing the information is irradiated; and a land track formed on said main body, which is adjacent to said groove track, as another track for recording the information onto which the light beam for recording and/or reproducing the information is irradiated, wherein a judgment wobble, which has a judgment pattern to judge whether the light beam is irradiated onto said groove track or said land track, is formed on only one side wall of said groove track, said apparatus comprising:

a track forming device for forming said groove track and said land track on said main body;

a generation device for generating a wobbling signal corresponding to the judgment pattern; and a wobble forming device for forming said judgment wobble on said only one side wall, on the basis of the wobble signal generated by said generation device.

8. A record medium manufacturing apparatus according to claim 7, wherein said main body is shaped in a disc, and said track forming device forms said groove track and said land track such that the information is recorded and/or reproduced while the light beam is relatively moving on said groove track and said land track alternately for each rotation of said record medium.

9. An information recording/reproducing apparatus for recording/reproducing information with respect to a record medium comprising: a main body; a groove track formed on said main body, as one track for recording the information onto which a light beam for recording and/or reproducing the information is irradiated; and a land track formed on said main body, which is adjacent to said groove track, as another track for recording the information onto which the light beam for recording and/or reproducing the information is irradiated, wherein a judgment wobble, which has a judgment pattern to judge whether the light beam is irradiated onto said groove track or said land track, is formed on only one side wall of said groove track, said apparatus comprising:

a detection device for detecting the judgment wobble;

a judgment device for judging whether the light beam is moving on said groove track or the land track on the basis of the judgment wobble detected by said detection device; and a recording/reproducing device for recording/reproducing the information with respect to said groove track and said land track, on the basis of a judgment result of said judgement device.

10. An information recording/reproducing apparatus according to claim 9, wherein said main body is shaped in a disc, and said apparatus further comprises: a tracking servo device for servo-controlling an irradiated position of the light beam on said record medium in a radial direction of said record medium; and a tracking control device for controlling said tracking servo device on the basis of the judgment result.

* * * * *